Sept. 22, 1964     E. FORNASIERI ETAL     3,149,911
PROCESS FOR PRODUCING TITANIUM TETRACHLORIDE
Filed June 20, 1961
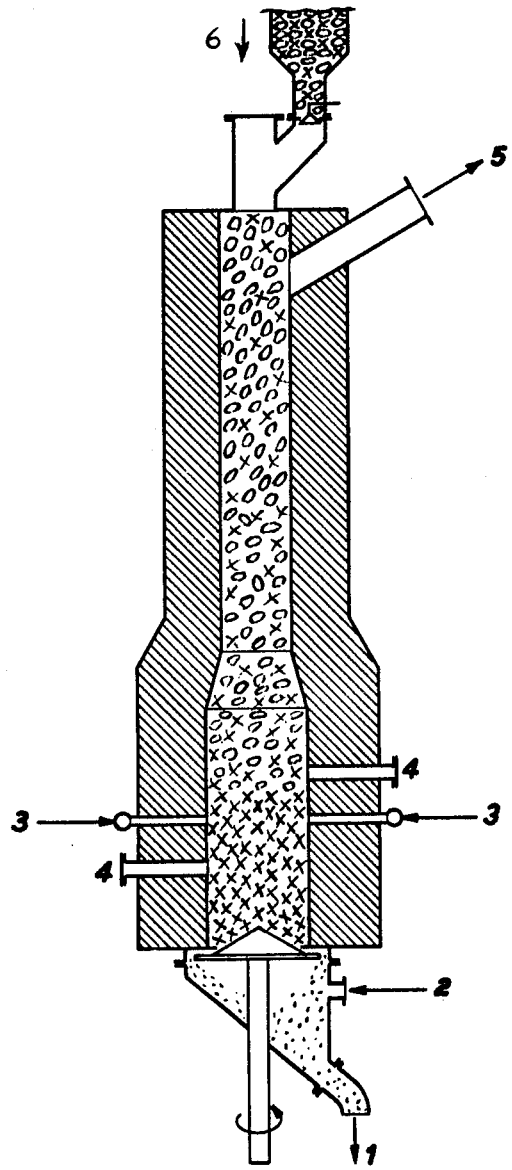
INVENTORS
Eraldo Fornasieri
and Aldo Forni

United States Patent Office 3,149,911
Patented Sept. 22, 1964

3,149,911
PROCESS FOR PRODUCING TITANIUM TETRACHLORIDE
Eraldo Fornasieri, Novara, and Aldo Forni, Galliate, Novara, Italy, assignors to Montecatini Societa Generale per l'Industria Mineraria e Chimica, a corporation of Italy
Filed June 20, 1961, Ser. No. 118,431
Claims priority, application Italy June 23, 1960
2 Claims. (Cl. 23—87)

Our invention relates to a process for producing titanium tetrachloride by chlorination at high temperature of an oxygenated titanium-containing material, agglomerated with a suitable amount of coal.

The formation of titanium tetrachloride by reacting gaseous chlorine with a mixture of titanium dioxide and coal is already known. This reaction takes place at high temperatures and is usually carried out between 500° and 1250° C.

This reaction, however, in large-scale processes for the continuous production involves serious technical difficulties which have not been successfully overcome.

The first attempts for carrying out such a reaction on a commercial scale comprised the preparation of briquettes of oxygenated titanium compounds (anatase oxide, mineral rutile, ilmenite slags, ilmenites, etc.) mixed with coal, and the continuous introduction of these briquettes into a furnace through the bottom of which a stream of gaseous chlorine was introduced. This resulted in the countercurrent passage of the solids and of the gas in the reaction chamber.

Titanium tetrachloride is discharged from the top of the reactor together with the other reaction gases while the chlorination ashes are discharged from the bottom.

Although the formation of $TiCl_4$ is theoretically exothermal (the degree depending on the titanium-containing material used), it was always necessary to provide for an auxiliary heat source.

An attempt at meeting that requirement was made by including an excess of coal in the charge of material to be chlorinated and then burning the same either intermittently by introducing air into the furnace alternately with $Cl_2$ or continuously by feeding the furnace with a mixture of chlorine with air and oxygen.

Other attempts to solve the problem required the inclusion of a titanium-containing material, such as a carbide or a cyanonitride, that can be easily chlorinated with a considerable heat development, or the provision of an auxiliary electric heating on the bottom of the furnace by means of suitably arranged graphite electrodes.

The above means never satisfactorily solved the problem and therefore the more recent technique directed its efforts towards the study of systems based on fluidized-bed chlorination.

Our experience has in fact shown that, for regular continuous production of $TiCl_4$, it is not sufficient to introduce into the furnace a mixture of chlorine and oxygen or air, for supplying a heat supplement by combustion of the excess coal as it appears, e.g., from U.S. Patent No. 2,486,912 to Belchetz.

In fact, under these conditions, since the gaseous feed is preheated by the first solid material encountered, there is a slow continuous raising of the reaction zone until the furnace is blown out, while a considerable proportion of the $Cl_2$ feed passes unaltered and is lost at the tail end of the plant.

We have found that the operating conditions capable of allowing a continuous $TiCl_4$ production are reached only by means of a suitable arrangement of the titanium-containing material and coal in the furnace as well as a particular and separate arrangement of the chlorine and combustion air feeding points.

The operating scheme of the furnace is evident from the accompanying figure.

Air, in a suitable amount, is fed to the bottom of the furnace and meets a first layer of coal pieces in which combustion takes place; the resulting gases in the subsequent layer of coal pieces are mixed with $Cl_2$ thus preheating the latter to the reaction temperature. It is obvious that, instead of air, a mixture of air and oxygen can also be used. Under these conditions chlorine easily reacts with the superimposed titanium-containing material thus giving $TiCl_4$.

The coal layer on the furnace bottom is kept at the desired level by continuous feeding of coal pieces in a suitable ratio with the briquettes of titanium-containing material. The briquettes being fed contain a total about 18 to 23% by weight of coal. About 5 to 15% of the charge is coal pieces.

As the titanium-containing material is chlorinated, the coal residual of the chlorination sinks thus feeding the layer below the $Cl_2$ feeding, where the combustion of the coal with air takes place.

The control of the desired level is carried out simply by withdrawing and analyzing samples of the material inside the furnace.

The ashes residual from the combustion and the chlorination are occasionally discharged from the furnace bottom by means of a suitable rotating grate.

The afore-described arrangement is of a fundamental importance, since, only in this manner, it is possible to realize a continuous operation of the reaction furnace obtaining yields of up to 98% in respect of $Cl_2$. By feeding chlorine and oxygen or air together instead of using the instant process, after 2 or 3 days of operation, the furnace would blow out of the top and give average yields of at most 50 to 60% in respect of chlorine.

A further advantage offered by our method consists of the fact that the ashes discharged from the bottom of the furnace are free of $Cl_2$ and $TiCl_4$ since, before discharging, they are washed for a long time by the combustion air stream; in this way a perfect protection of the bottom grate is also obtained which can therefore be made of a common metallic material.

The accompanying drawing illustrates a furance for carrying out our processes. Briquettes to be chlorinated (indicated with OO) and coal in excess (indicated with XX) are charged into hopper 6.

Ashes are discharged from the bottom of the furnace through 1 by means of a rotating grate 7. The air required for the combustion of the excess coal is introduced at 2.

Gaseous chlorine is fed through 3 at room temperature. Above and below the chlorine inlet, two flanged pipes 4 are placed, which serve for withdrawing the samples. The reaction products are removed from the furnace top through pipe 5.

The following example is given to illustrate the present invention without limiting its scope.

*Example*

A furnace of the type shown in the drawing, consisting essentially of a shaft chamber, with an upper and lower diameter of 300 and 570 mm. respectively and a height of 4.750 mm. was filled up to the height of 1 m. with charcoal which was fired in an air current. By feeding petroleum coke in the form of pieces, the coal level in the furnace was raised to a height of about 2 m. When the temperature of the reaction chamber reached 800° C., the chamber was filled with briquettes of titanium-containing material mixed with about 16% of petroleum coke pieces.

The briquettes of titanium-containing material had previously been prepared by mixing 78 parts of powdered titanium dioxide with 17 parts of petroleum coke powder and 10 parts of an organic binder which by calcination gave a coal residue of 50%. The resulting mixture was then kneaded with water and pressed into briquettes by means of a press. Before introducing the briquettes into the furnace, they were dried and calcined under an inert gas atmosphere so as to reduce their hydrogen content to a minimum.

When the temperature of 800° C. was again reached in the upper section of the reaction furnace, the combustion air was regulated to a value of about 10 m.³/hr. and the introduction of chlorine, at a flow rate of about 26 kg./hr., was initiated. As the charge was consumed with the formation of $TiCl_4$, $CO$ and $CO_2$, further additions of fresh charge were effected from the top of the reaction furnace. The gases leaving the furnace were suitably cooled to condense $TiCl_4$ as crude product. In this way $TiCl_4$ can be continuously produced without any limit of time.

By way of example, the material balance relating to a 800-kg. $Cl_2$ bottle, calculated for a period of operation of the experimental plant for 30 hours, is given. The experimental plant in question had been operating previously for 99 hours.

Balance time: 30 hrs.; chlorine consumption 800 kg.; crude $TiCl_4$ obtained: 1.057 kg.; yield on $Cl_2$: 98.7%. The yield on the fed titanium, calculated at the end of each run, ranged around 97–99%.

We claim:
1. A continuous process for producing titanium tetrachloride from oxygenated titanium-containing material which comprises burning within a furnace a lower layer of coal with air, using the reaction products of said burning to preheat chlorine, passing said preheated chlorine upwardly through a bed, within said furnace, consisting of 95 to 85% by weight of briquettes and 5 to 15% of coal pieces, said briquettes consisting essentially of titanium-containing materials and coal, the coal in the briquettes being from about 18 to 23% by weight of the briquettes.

2. A continuous process for producing titanium tetrachloride from oxygenated titanium-containing material which comprises introducing a charge consisting essentially of 95 to 85% by weight of briquettes of titanium-containing materials and coal, said coal being from about 18 to about 23% by weight of said briquette, and about 5 to 15% by weight of coal pieces, at the top of a furnace, introducing chlorine into said furnace at such a height so as to assure substantially complete chlorination of the titanium contained in said briquettes and introducing oxygen-containing gas into said furnace at a point below that of said chlorine introduction whereby complete combustion of coal pieces is assured, and removing titanium tetrachloride from the top of said furnace and ashes from the bottom of said furnace.

References Cited in the file of this patent
UNITED STATES PATENTS

| | | |
|---|---|---|
| 2,184,885 | Muskat et al. | Dec. 26, 1939 |
| 2,184,887 | Muskat et al. | Dec. 26, 1939 |
| 2,378,675 | Agnew et al. | June 19, 1945 |
| 2,589,466 | Wilcox | Mar. 18, 1952 |
| 2,805,120 | Plant | Sept. 3, 1957 |
| 2,805,919 | Ishizuka | Sept. 10, 1957 |